Aug. 11, 1925.
W. E. POTTEIGER
AUTOMATIC GAS REGULATOR
Filed April 3, 1923
1,549,216
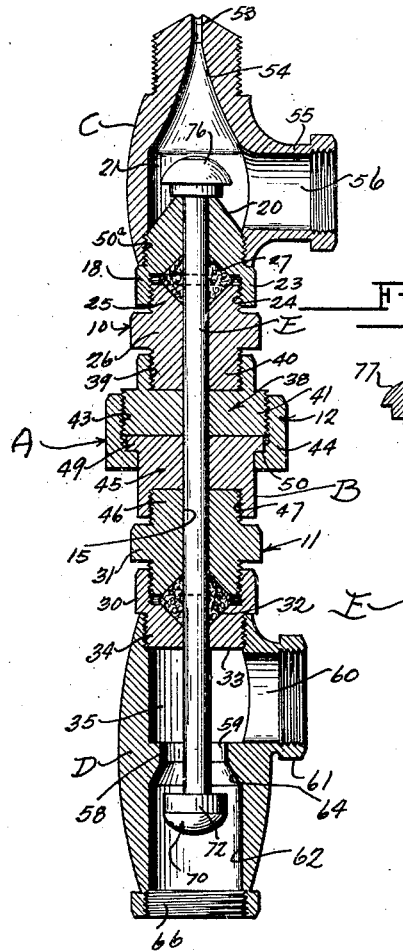
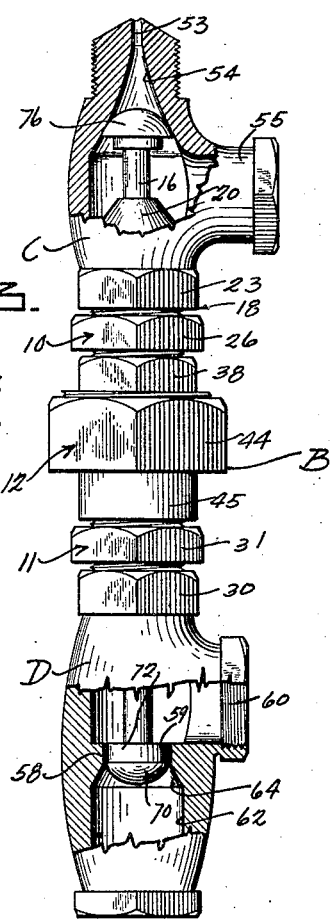
Inventor
William E. Potteiger.
By Lancaster and Allwine
Attorneys Patented Aug. 11, 1925.

1,549,216

UNITED STATES PATENT OFFICE.

WILLIAM E. POTTEIGER, OF HARRISBURG, PENNSYLVANIA.

AUTOMATIC GAS REGULATOR.

Application filed April 3, 1923. Serial No. 629,654.

*To all whom it may concern:*

Be it known that I, WILLIAM E. POTTEIGER, a citizen of the United States, residing at Harrisburg, in the county of Dauphin and State of Pennsylvania, have invented certain new and useful Improvements in Automatic Gas Regulators, of which the following is a specification.

This invention relates to improvements in automatically operable regulators for controlling the flow of gas.

The primary object of this invention is the provision of a relatively simple and compact type of regulator, responsive to hydraulic pressure for controlling flow of gas.

A further object of this invention is the provision of a device of the above mentioned character embodying a valve mechanism controlled in effective manner by hydraulic pressures, so that during flow of water the hydraulic pressure will be maintained so that the unit will permit of continued flow of gas therethrough, said unit when flow of water is stopped being so arranged that hydraulic pressure may quickly act upon a valve mechanism therein to cut off flow of gas therefrom.

A further object of this invention is the provision of an automatic gas regulator of the above mentioned character, which is not only compactly formed, but which is quick acting, in that both gas and water pressures are taken advantage of in constantly acting to maintain a valve mechanism in position to cut off flow of gas when flow of water is cut off therethrough.

Other objects and advantages of this invention will be apparent during the course of the following detailed description.

In the accompanying drawing, forming a part of this specification, and wherein similar reference characters designate corresponding parts throughout the several views.

Figure 1 is a longitudinal cross sectional view, taken through the improved automatic gas regulator mechanism, showing the valve mechanism therein as positioned during flow of water therethrough, so that gas may flow in unrestricted manner therethrough.

Figure 2 is a side elevation, partly in section, showing closed positions of the valve means which the same will assume when water is stopped from flow therethrough.

Figure 3 is a side elevation, partly in cross section, of a novel type of piston mechanism used in connection with the improved regulator.

In the drawing, wherein for the purpose of illustration is shown but the preferred embodiment of this invention, the letter A may generally designate the improved automatic gas regulator, which may include a supporting body B consisting of an upper stuffing box 10, lower stuffing box 11, and coupling means 12; a gas nozzle C; a water head or connection D; and the piston device E.

Referring to the supporting body B, the upper and lower stuffing boxes 10 and 11 thereof, and the coupling 12 provide a passageway 15 therethrough, within which the piston rod 16 of the piston device E snugly fits for sliding.

Referring to the upper stuffing box 10, the same preferably includes the gas nozzle attaching portion 18, which is preferably provided with an upper conical surface 20, which is positioned within the gas chamber 21 of the nozzle C, as will be subsequently described. This portion 18 of the stuffing box construction 10 is preferably provided with an outer wrench engaging portion 23, providing a screw threaded socket 24 therein for detachably receiving the exteriorly screw threaded reduced shank 25 of the other part 26 embodied in the stuffing box 10. The facing surfaces of the members 18 and 26 are preferably recessed in the conventional manner for receiving packing material 27 therein, so that when the piston device E is in assembled relation therewith, said packing material 27 will be in snug engagement with the rod portion 16 of said piston device E.

The lower stuffing box construction 11 is altogether analogous to the stuffing box construction 10, including detachable members 30 and 31, respectively analogous to the members 18 and 26 of the stuffing box construction 10, and which receive therebetween packing material 32, to form a leak proof connection about the piston rod 16.

The member 30 of the stuffing box construction 11 is preferably provided with an outer flat face 33 at the end of the exteriorly screw threaded end shank 34 thereof. The face 33 forms an upper wall for the water chamber 35 of the water head or connection D, when the shank is screwed into the water head.

Referring to the coupling 12 of the supporting body B, the same preferably includes a connection 38 providing an internally screw threaded socket 39 on one end thereof for detachably receiving in screw threaded engagement the reduced screw threaded shank 40 of the member 26 of stuffing box 10. The remaining portion 41 of the connection 38 is externally screw threaded for detachable reception within an internally screw threaded socket 43 of a coupling nut 44. A connection 45 is preferably provided for detachably receiving the exteriorly screw threaded shank 46 of the stuffing box member 31 within the internally screw threaded socket 47 thereof; said member 45 at its other end providing an annular flange 49 for seating upon an annular shoulder 50 within the socket 43 of the coupling nut 44. In this position, the coupling nut 44 may be used for snugly and fixedly connecting the pieces 38 and 45 in abutting relation, substantially as is illustrated in Figure 1 of the drawings. In this relation of parts of the supporting body B, a passageway 15 is provided axially therethrough, open at both ends thereof for slidable reception of the piston rod 16 therein.

Referring to the gas nozzle or head C, the same is preferably of one piece construction, having the lower end thereof internally screw threaded, as at 50ª, for detachable connection to the screw threaded end of the stuffing box member 18 so that the upwardly converging surface of the conical head 20 is disposed within the main chamber 21 of the nozzle C. This nozzle is so constructed that the chamber 21 gradually converges to the relatively small exit passageway 53 at the upper end of the nozzle C, which aligns axially with the piston rod 16. It is thus observed that the nozzle C provides the longitudinal convexing and upwardly converging surfaces 54 intermediate the main chamber 21 and the exit passageway 53. The inlet extension 55 is laterally formed upon the nozzle C, substantially at right angles thereto, providing the relatively large passageway 56 through which the gas flows into the chamber 21. This inlet passageway 56 directly exposes the conical surface 20 therethrough, so that gas entering the nozzle chamber through the inlet passageway 56 will flow about and upwardly upon said conical surface or head portion 20 of the stuffing box construction 10.

At its lower end the automatic gas regulator has the water head or connection D attached to the member 30 of the stuffing box 11. This water head D, as above mentioned, provides the chamber 35 therein, and has the annular flange 58 extending inwardly thereof, which provides the cylindrical passageway 59, which is of relatively smaller diameter than the diameter of the chamber 35 into which the water flows directly through the inlet passageway 60. This inlet passageway 60 is provided at right angles to the axis of the connection D, having a lateral attaching flange 61 thereabout. The outer end of the water head or connection D provides a passageway or chamber 62, of substantially the same diameter as the chamber or passageway 35, and in alignment therewith, having communication through the reduced passageway 59 formed by the annular shoulder 58. The annular shoulder or flange 58, in fact, provides the tapered surface 64, which converges from the opening 59 into the surface defining the outer chamber or passageway 62. At its outer end, the member D may be internally screw threaded, as at 66, for connection to any suitable conduit.

Referring to the piston device E, the same preferably includes the piston rod 16 above mentioned, of uniform diameter throughout. At its lower end, a piston head 70 is preferably provided, which provides the surface 71 lying in a plane at right angles to the axis of the rod 16 and facing in the direction of said rod. This head 70 also provides the cylindrical shaped annular circumference 72, and the convex outer portion 73. At its other end, the piston rod 16 is screw threaded, as at 75, for detachably receiving a valve head 76 of novel construction, which provides the outer convex surface 77 and the shoulders 78 and 79 at the other side thereof, which are disposed in planes at right angles to the axis of the rod 16.

In operation, the piston device E is disposed so that the rod 16 thereof is slidable within the passageway 15 of the body B, with the lower head 70 thereof extending into the passageway of the water head or connection D. The valve head 76 extends into the chamber 21 of the gas nozzle C. It should be noted that the diameter of the cylindrical portion 72 of the head 70 is such that when positioned in the passageway 59, the head 70 will be spaced slightly from the walls of this passage and water permitted to seep through the passageway. Therefore water above and below the head will be at an even pressure when the valve is positioned as shown in Figure 2.

During flow of water through the water head or connection D, the water being received from a suitable supply pipe (not shown) which will be screwed into the neck 60, said water will, incident to rush of the same through the water head D upon the surface 71 of the piston head 70, tend to move the head from the position which it normally occupies in the reduced passageway 59 formed by the flange 58, so that the rod 16 is slid into the position illustrated in Figure 1 and the head 76 moved downwardly to an open position. This will permit gas to flow unrestricted through the nozzle C, first entering the chamber 21 thereof through the inlet passageway 56, and passing therefrom thru the restricted nozzle 53, at an increased velocity. It will thus be seen that when a spigot controlling flow of water through a pipe leading from the outlet 66 is turned on the force of the water acting against the head 70 will overcome the pressure of the gas acting against the face or shoulder 78 of the head 76 and the valve will be retained in the open position. Therefore gas will pass through the nozzle C and through a suitable pipe to a burner. The amount the valve head 76 is lowered will of course be controlled by the speed at which the water is permitted to flow through the connection D.

When the flow of water is shut off the pressure of the water above and below the valve head 70 is of course equal and the gas which spirals around the conical face 20 and engages the shoulder or face 78 of the head 76 will then have force enough to raise the head 76 and stem and return the valve to the closed position shown in Figure 1. It will thus be seen that the valve will be normally closed but will be opened when the water is flowing through the connection D and further will be closed again when the flow of water is cut off. When the spigot is only partially opened and the water moves the valve stem and heads partially to a fully opened position, the action of the gas against the shoulder 78 prevents the valve from moving downwardly to its full extent.

From the foregoing description of this invention, it is apparent that an automatic gas regulator has been provided, which is relatively simple in construction, compact, and which is quick acting, in that the same utilizes gas and hydraulic pressure for action of the valve mechanism therein.

Various changes in the shape, size and arrangement of parts may be made to the form of invention herein shown and described, without departing from the spirit of the same or the scope of the claims.

I claim:

1. In a device of the class described, the combination of a supporting body including upper and lower stuffing boxes having adjustably connected upper and lower sections, coupling blocks secured to said stuffing boxes, and a coupling sleeve loosely fitting upon one block and in threaded engagement with the other block to hold said stuffing boxes in connected alignment, said supporting body providing an axial passageway extending therethrough; a member supported at the upper stuffing box providing a gas chamber therein having a constricted exit and an inlet therefor; a member supported by the lower stuffing box providing a water chamber therein having inlet and exit openings therefor; a rod slidable in the passageway axially provided by said supporting body having the ends thereof extended into the gas and water chambers, a valve head upon the end of said rod within said gas chamber adapted for cooperation within the exit passageway therein to regulate flow of gas therefrom, and a head upon the other end of said rod within said water chamber and normally disposed intermediate the inlet and exit openings of the member providing said water chamber.

2. An automatic gas regulator comprising a body providing an axial passageway therethrough, a stem slidable in said axial passageway, means providing upper and lower packings about said rod, a member carried at one end of said supporting body providing a gas chamber therein having inlet and exhaust openings therein, a valve head detachably carried by said rod within said gas chamber intermediate the inlet and exhaust openings thereof and having an arcuate upper surface and its lower portion provided with annular abutment shoulders, a member carried by the other end of said supporting body providing a water chamber therein having inlet and exhaust openings therein and a constricted portion between the openings, and an enlarged head carried by the rod within said member disposed intermediate the inlet and exhaust openings of the water chamber therein and of a size to pass freely through the constricted portion and having a flat upper surface.

WILLIAM E. POTTEIGER.